United States Patent [19]

De Kelaita et al.

[11] Patent Number: 4,713,758
[45] Date of Patent: Dec. 15, 1987

[54] COMPUTER TESTING ARRANGEMENT

[75] Inventors: Nergal R. De Kelaita, Skokie; Joe T. Hall, Winfield; Barrie D. Kletscher, Plainfield, all of Ill.

[73] Assignee: American Telephone and Telegraph Company, AT&T Bell Laboratories, Murray Hill, N.J.

[21] Appl. No.: 728,671

[22] Filed: Apr. 29, 1985

[51] Int. Cl.⁴ .............................................. G06F 11/00
[52] U.S. Cl. ........................................ 364/200; 371/16
[58] Field of Search ... 364/200 MS File, 900 MS File, 364/300; 371/16

[56] References Cited

U.S. PATENT DOCUMENTS

| Re. 31,407 | 10/1983 | Furtman et al. | 364/200 |
| 4,166,290 | 8/1979 | Furtman et al. | 364/200 |
| 4,231,087 | 10/1980 | Huntsberger et al. | 364/200 |
| 4,369,494 | 1/1983 | Bienvenu et al. | 364/200 |

FOREIGN PATENT DOCUMENTS 2460007  1/1981  France .

OTHER PUBLICATIONS

"The UNIX Time-Sharing System", Dennis M. Ritchie & Ken Thompson, *Communications of the ACM*, Jan. 1974, vol. 17, pp. 365-375.

*Primary Examiner*—Raulfe B. Zache
*Attorney, Agent, or Firm*—Peter Visserman

[57] ABSTRACT

In the disclosed system, the operation of a target computer is monitored by a terminal controller connected to one or more of the computer's input/output ports. The controller can send data on one of the computer's ports and simultaneously record and monitor computer response at several of the computer's input/output ports. Two data queues are provided for each monitored port and received data is stored in a first queue, referred to as a spooler queue, and may be searched for a specified character string before it is transferred to the second queue called the demux queue. Received information, in addition to being searched for a specified character string, is also examined for message type and a message type designation is added to each data word or message transferred to the demux queue. From the demux queue the data is transferred to different storage files depending upon the message type designation. The transfer of data through the queues is controlled by several processes which communicate via a shared memory area. Such a set of queues and processes is provided for each monitored port, operating independently from processes for other ports.

21 Claims, 22 Drawing Figures

SWITCH SPOOLER ROUTINE

DEMUX PROCESS

DEMUX ROUTINE

CHANGE ROUTINE

SWITCH Q ROUTINE

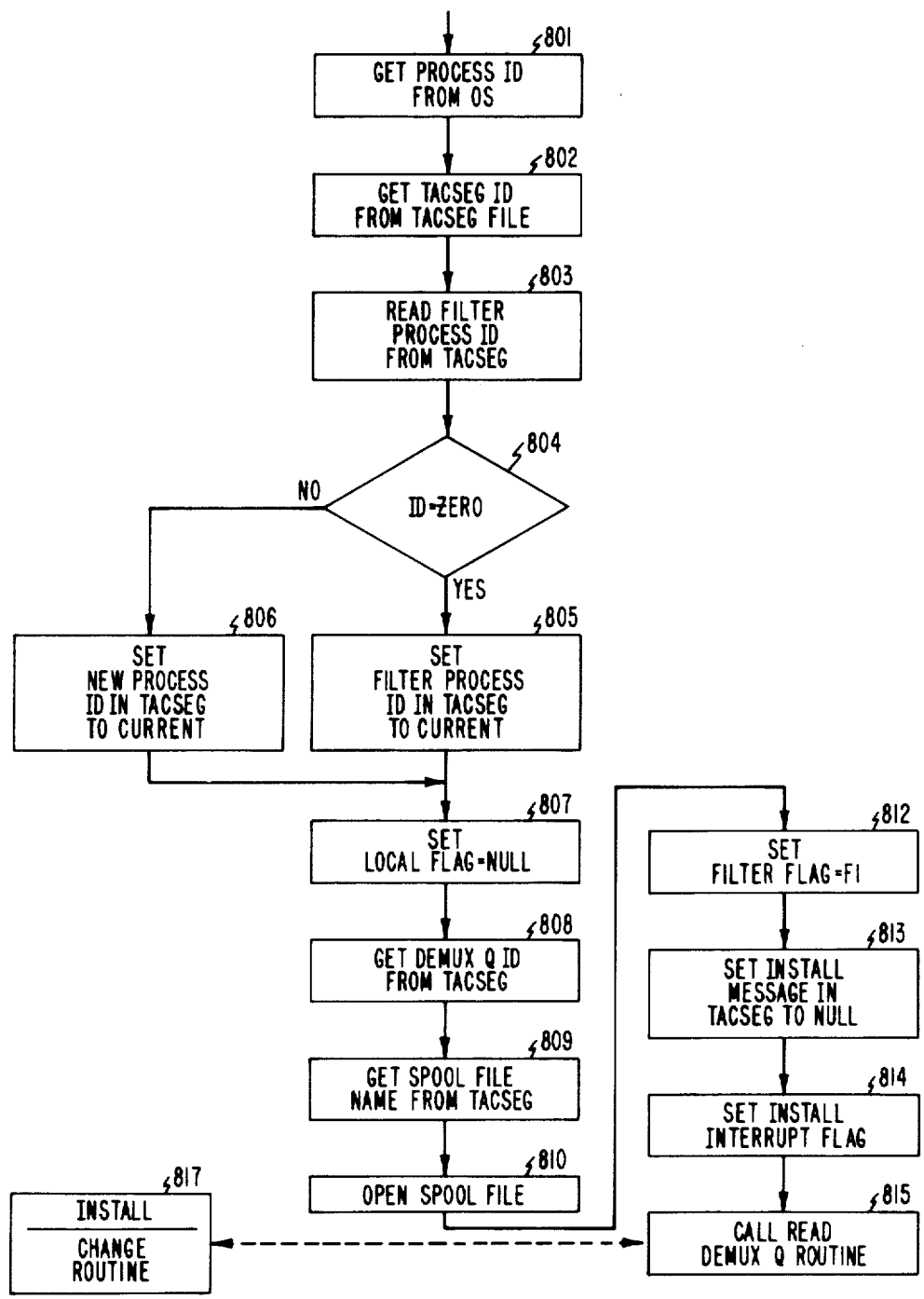

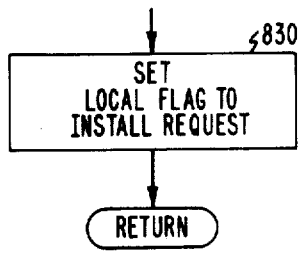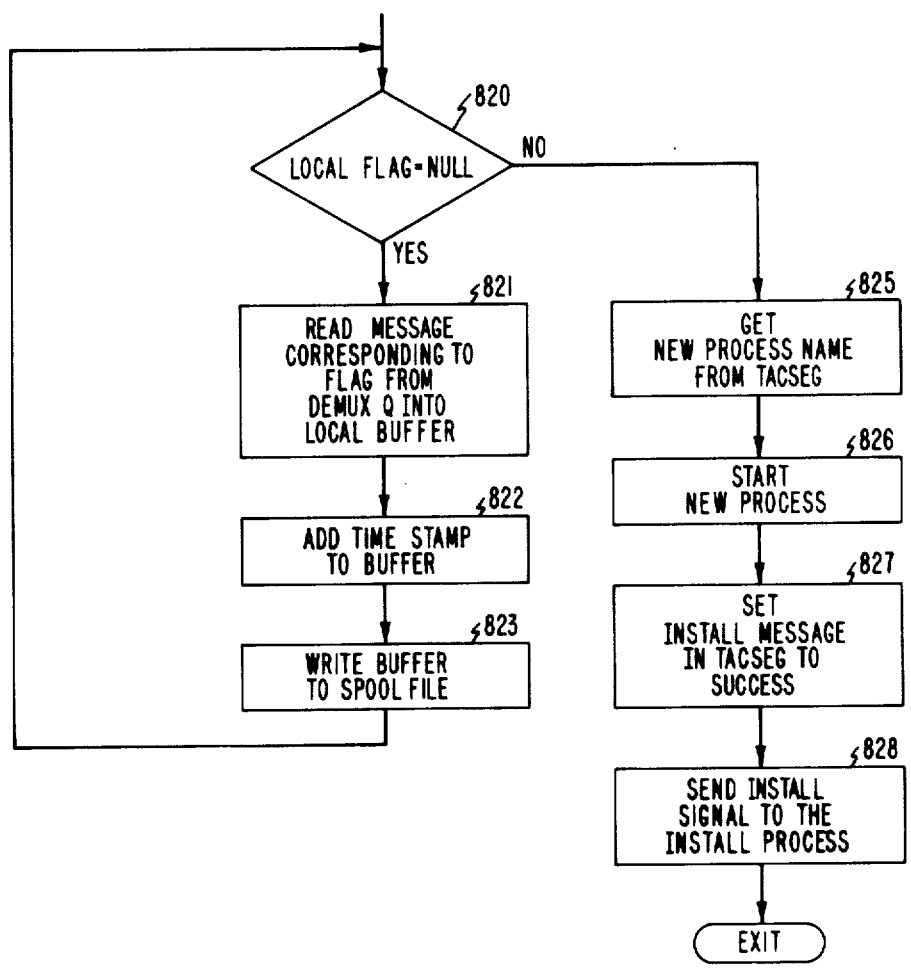

TC SEND PROCESS

READ Q ROUTINE

SEARCH ROUTINE

INSTALL PROCESS

FIG. 22

TACSEG

| SPOOLER PROCESS ID |
|---|
| SPOOL FILE NAME |
| SPOOL Q ID |
| SPOOLER MESSAGE |
| CHANNEL NUMBER |
| CHANNEL BAUD RATE |
| CHANNEL DESCRIPTOR |
| DEMUX NAME |
| DEMUX PROCESS ID |
| DEMUX NEW PROCESS NAME |
| DEMUX MESSAGE |
| DEMUX Q ID |
| DEMUX NEW PROCESS ID |
| INSTALL MESSAGE |
| FILTER NEW PROCESS ID |
| FILTER NEW PROCESS NAME |
| INSTALL PROCESS ID |
| FILTER PROCESS ID |
| FILTER NAME |
| TC SEND PROCESS ID |

COMPUTER TESTING ARRANGEMENT

TECHNICAL FIELD

The invention relates to an arrangement for testing the operations of computers and, more particularly, to such an arrangement which is connected directly to the input and output ports of a computer and which provides input data to a target computer to be tested and which receives and stores output data from the target computer in designated data files.

BACKGROUND OF THE INVENTION

The complexity of a computer system tends to grow as its size and capabilities increase and the exhaustive testing of a complex system is a difficult and time consuming task. In modern computer systems, the "intelligence" and the greatest complexity is in the programs which control the computer hardware to perform desired functions. The programs are customarily divided into two levels called operating system programs and application programs The operating system programs directly control a number of specialized system functions; the application programs define the functions to be carried out by the system and control the system through the operating system programs. The computer system hardware and operating system generally are designed by the supplier of the computer system. Application programs, however, may be designed by the computer purchaser for special applications or by third parties who develop application programs to perform certain functions, e.g., a spread sheet program for use in accounting applications.

Testing of the design of the hardware and the operating system is done when new hardware or a new operating system is introduced. Application programs may consist of a complex set of programs which enable the computer system to execute complicated tasks for a variety of applications. New or modified application programs, which interact with existing programs, may be added from time to time. Furthermore, the application programs may have options that interact with a variety of complex input/output devices. It is of utmost importance to the proper operation of a computer system that the operating system and application programs be tested properly.

One known scheme of testing programs is to load them into a computer and to exercise the programs and observe the results by means of the computer's standard input/output facilities. However, to exhaustively test a set of complex programs using the normal user interface is a time consuming task. Furthermore, such testing requires that a complete complement of input/output facilities be connected to the system.

Another possible approach is to test the programs by means of an auxiliary processor connected to the target computer which emulates its input/output terminals. A computer normally has a number of input/output ports to which input/output terminals are connected. The auxiliary processor may be connected to ports of the target computer instead of terminals to provide test input data to the computer and to collect resulting output data. The collected output data may be stored in a data file in the auxiliary processor as it is received. The target computer output data can be examined to detect specified data patterns which indicate, for example, that a task has been completed in response to specific input data. The received data can be examined in the auxiliary processor by searching the data files where the data has been stored. However, data cannot be entered in a file while it is being searched. Consequently, any data appearing on the output port of the target computer during the search will be lost, hampering adequate testing.

Many modern computers use video display terminals having several so-called windows Data may be displayed in each window which is unrelated to data displayed in the other windows. The multiwindowed display terminal is customarily connected to a single input/output port and window identifying information is transmitted with the data identifying the appropriate window. Emulation schemes whereby data is stored as it is received from computer input/output ports do not differentiate between data belonging to different windows of a multiwindowed display terminal.

SUMMARY OF THE INVENTION

These and other problems are solved and the shortcomings of the prior art overcome by an arrangement which connects to input/output ports of a computer and which stores data received from a computer output port in a data queue, examines the data, and selectively transfers different data messages to different data storage areas depending upon message content. In one specific embodiment of the invention, incoming data is first stored in a spool queue, is subsequently analyzed and stored in a demultiplex queue together with a designation defining message type derived on the basis of predefined identification criteria. Data messages with different type designations are transferred from the demultiplex queue to different areas of a data file store. Furthermore, in accordance with this invention, data may be filtered before being placed in a data file in accordance with predefined filtering criteria. In one embodiment of the invention, the analysis of data messages for message type identification and the filtering function are performed by programs and the predefined identification and filtering criteria may be changed in response to a program instruction. Advantageously, in a system in accordance with this invention, data words may be identified by type and may be modified by filtering without interfering with the flow of incoming data words and furthermore, the type identification criteria and filtering criteria may be changed without interrupting the data flow and without loss of data messages.

Further, in accordance with this invention, incoming data words may be searched before being stored in a permanent data file. The incoming messages are stored in the temporary data queue together with a first indication. All such messages are then searched and a second indication is entered in the queue with each searched message. Only messages having the second indication are transferred from the data queue to the data storage file. Advantageously, this allows incoming computer response messages to be searched for a predefined character string without interrupting the message flow and without the loss of any incoming messages.

BRIEF DESCRIPTION OF THE DRAWING

The invention may be more fully understood with reference to the drawing wherein:

FIG. 12 is a flowchart representation of the filter process which transfers data from the demux queue to the data file store;

FIGS. 13 and 14 are flowchart representations of subroutines of the filter process of FIG. 12;

FIG. 22 is a memory layout of a section of memory shared among the various processes.

DETAILED DESCRIPTION

Figure 1:
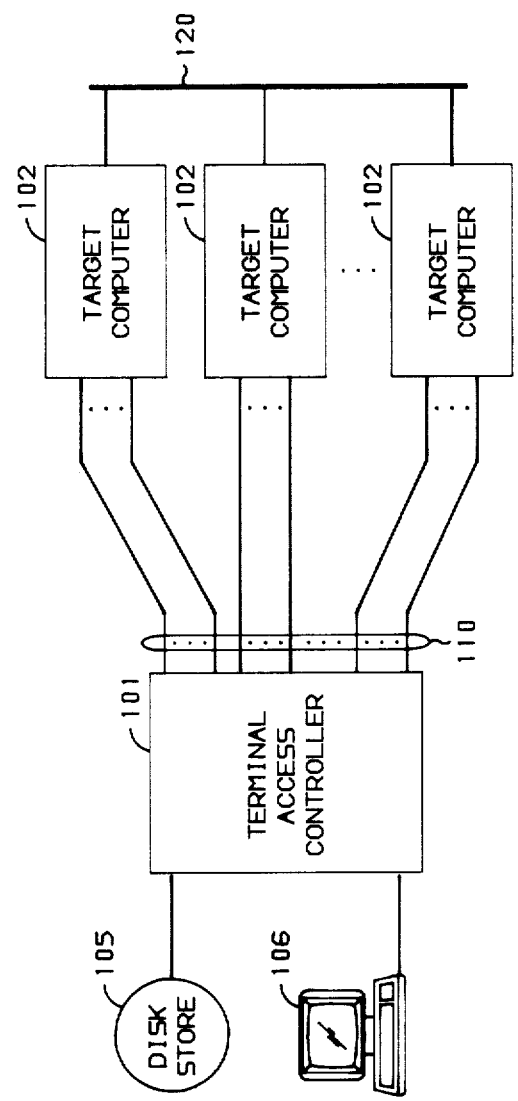
FIG. 1 is a schematic block diagram of a computer testing arrangement in which the present invention may be practiced.

FIG. 1 shows a plurality of interconnected target computers 102 and a terminal access controller 101 for simultaneously controlling or testing the target computers. Standard input/output ports of the target computers are connected to the terminal access controller 101 to provide a single point of control and test access. A standard interface is used between the target computers and the terminal access controller, such as the ASCII data format. Any other format which is compatible between the terminal access controller and the target computers may be used. The terminal access controller 101 in this arrangement replaces the normal input/output terminals of the target computer. Interconnecting cables 110 extend between input/output ports of the terminal access controller and the input/output ports of the target computers. The terminal access controller may be any known computer for example, the AT&T 3B20S, which will be equipped with memory for storing programs and data including a disk store 105, and input/output facilities for providing user access, such as terminal 106. The target computers 102 may be any standard computer which will respond to data applied at an input/output port to provide a response at one of its input/output ports. The terminal access controller will apply a series of input commands to a target computer at an appropriate port via one of the cables 110 and record all data generated at the ports connected to the terminal access controller. The controller 101 can monitor and record all information, received and transmitted, on all of its active ports. The recorded information may be further analyzed to identify actions that the target produced in response to inputs supplied to its ports.

The several target computers 102 may be interconnected as, for example, by means of a network 120, which may be a well-known local area network. The interconnection and interaction between two or more target computers may be tested by applying input commands at a port of one of the targets and observing the results at ports of one or more of the other target computers. Since the terminal access controller can monitor and record information on all of its active ports, all of the output activity of all of the target computers can be simultaneously recorded.

Figure 2:
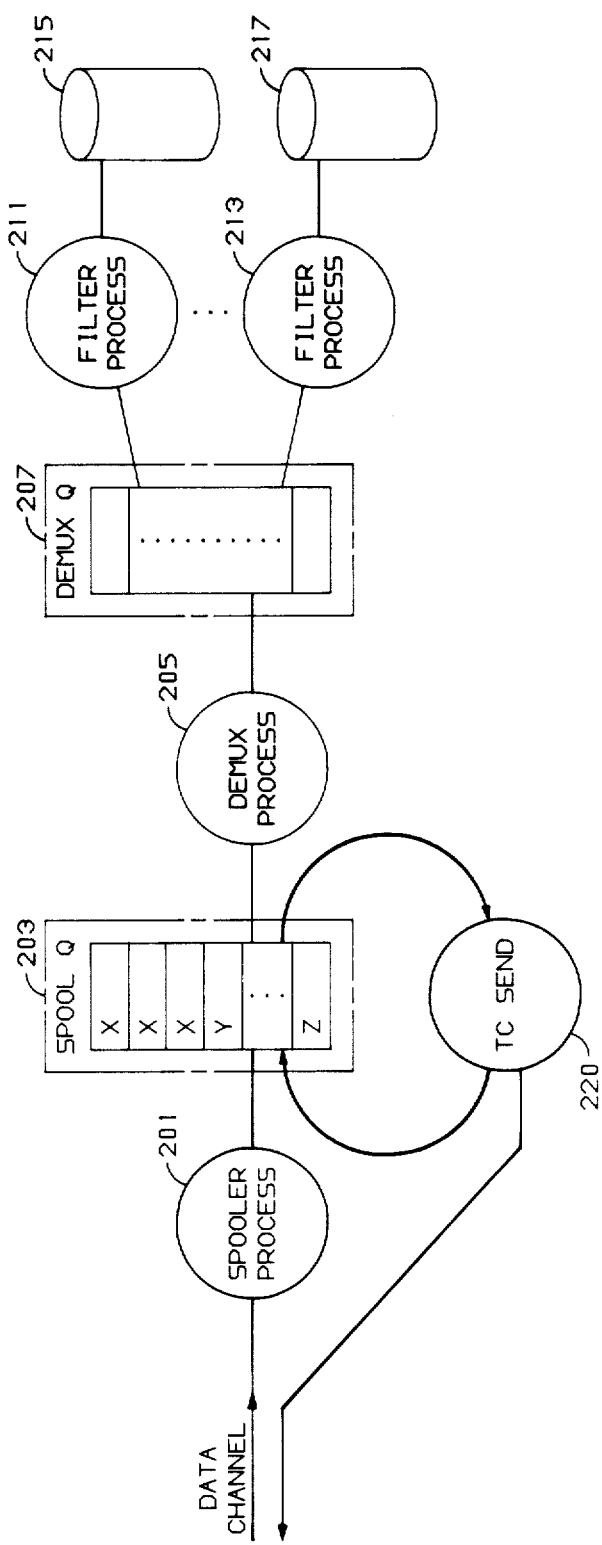
FIG. 2 is a block diagram representation of the storage arrangements and program processes which are implemented in the system of FIG. 1.

The terminal access controller 101 has in its program structure a number of processes which perform specified functions with respect to the ports connected to the target computers. FIG. 2 is a logical representation of the various processes which are individually assigned to each active port of the terminal access controller as defined by the user.

FIG. 2 shows a spooler process 201 which reads data transmitted or received on the associated port and stores it in a spool queue 203. A demultiplexing process 205, referred to as the demux process, reads messages from the spool queue, analyzes them for message type and enters them in the demultiplex queue 207, also called demux Q. The spool queue 203 and the demultiplex queue 207 are selected areas of the memory of the terminal access controller 101. Two filter processes, 211 and 213 are shown in FIG. 2 with associated data files 215 and 217, respectively. Several filter processes read the demultiplex queue 207 and each selects only data messages of a predetermined message type and stores them in its associated data file. Each filter may also delete data fields not of interest to the user or otherwise modify selected data fields prior to storing the messages in the data file. The number of filters associated with a demultiplex queue, depends upon the complexity of the computer terminal which would normally be connected to the target computers. For example, when a port of the terminal access controller is connected to a port of the target computer normally connected to a multiwindowed display terminal, a separate filter process is provided for each window of the terminal. FIG. 2 further shows the tc send process 220, which transfers such messages via the input/output port to the target computer. This process can also search messages in the spool queue 203 for a predefined string of characters before the message is removed from the spooler queue by the demultiplexer process 205. This arrangement allows incoming messages to be searched prior to being stored in the files and without in any way delaying or interfering with the messages being received from the target. It should be understood that FIG. 2 represents the processes used for a single port of the terminal access controller 101. A similar set of processes, queues and data files exist for each active port.

Figure 3:
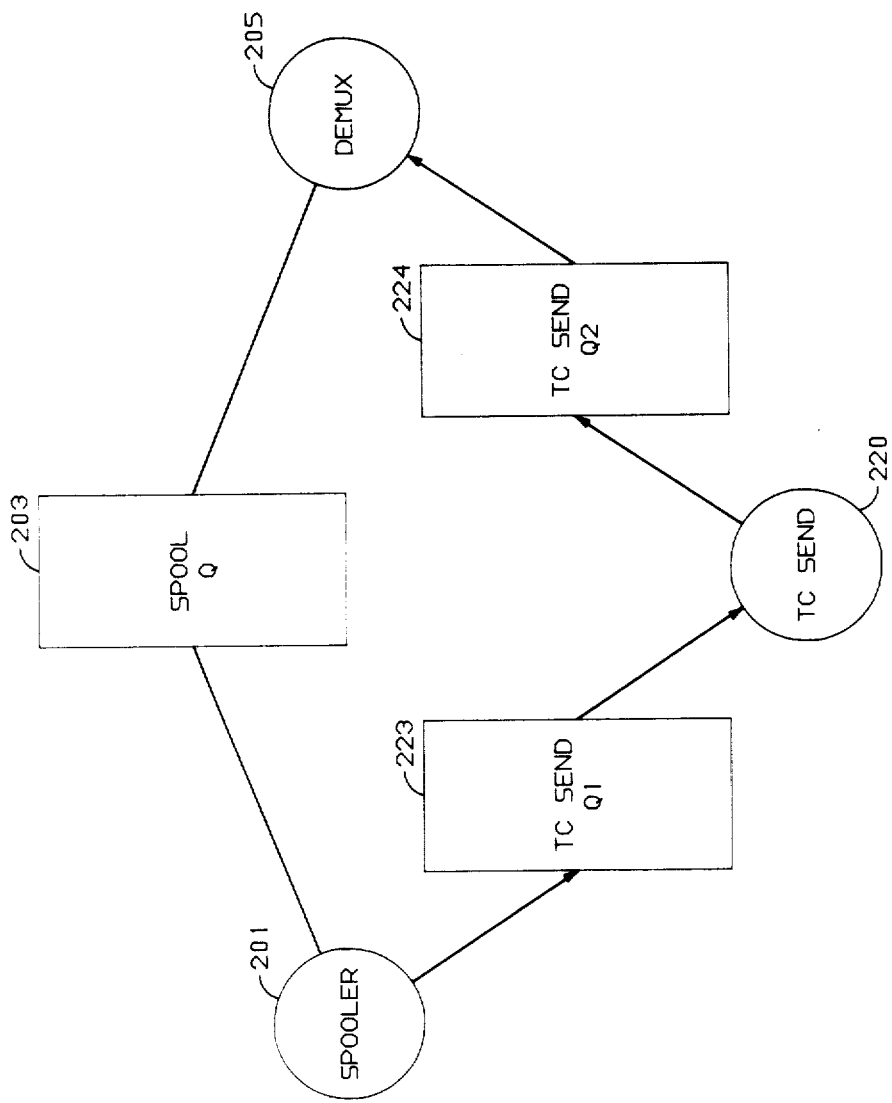
FIG. 3 shows processes and queues for implementing a searching function in the system of FIG. 1.

FIG. 3 provides one illustrative implementation for performing a search on data received by the spooler process 201. In this arrangement, when the tc send process 220 is initiated, the spooler process 201 stores input messages in the first tc send queue 223. The tc send process 220 obtains the messages from this queue and performs the normal search operation and stores the searched messages in the second tc send queue 224. From there, the messages are retrieved by the demultiplex process 205 and handled in the manner as described above, with respect to FIG. 2. In the following description, an alternative arrangement using a single queue is described in detail. The three-queue arrangement of FIG. 3 can be readily implemented based on that description.

The entire program is executed on the support processor 101 under control of an operating system, which may be implemented on any number of commercially available computers running under any number of known operating systems. One known operating system is the UNIX* operating system marketed by AT&T Company and described, for example, in *UNIX Time-Sharing Systems: UNIX Programmers Manual*, Bell Telephone Laboratories, Incorporated, 1983, Holt, Rinehart and Winston, New York, N.Y. UNIX is a trademark of AT&T Bell Laboratories. In this illustrative embodiment the UNIX TM operating system is used. The various processes shown in FIG. 2 run under the operating system cooperate to perform the total function of handling data in the system. Certain information used by the processes is stored in a shared memory area referred to as TACSEG. The various processes communicate via the TACSEG and user-supplied information is stored there. When any of the processes is initiated, the process will read an area at a fixed address in permanent memory called TACSEG FILE. This will contain information which identifies the location of the shared memory area. FIG. 22 is a memory layout of TACSEG showing various data items stored in it. The TACSEG of FIG. 22 will be referenced from time to time in the following description of the various processes. It should be understood that FIG. 22 contains only the information for the one set of processes illustrated in FIG. 2. A similar set of entries in TACSEG will be required for the processes of each active port of the terminal access controller.

Figure 4:
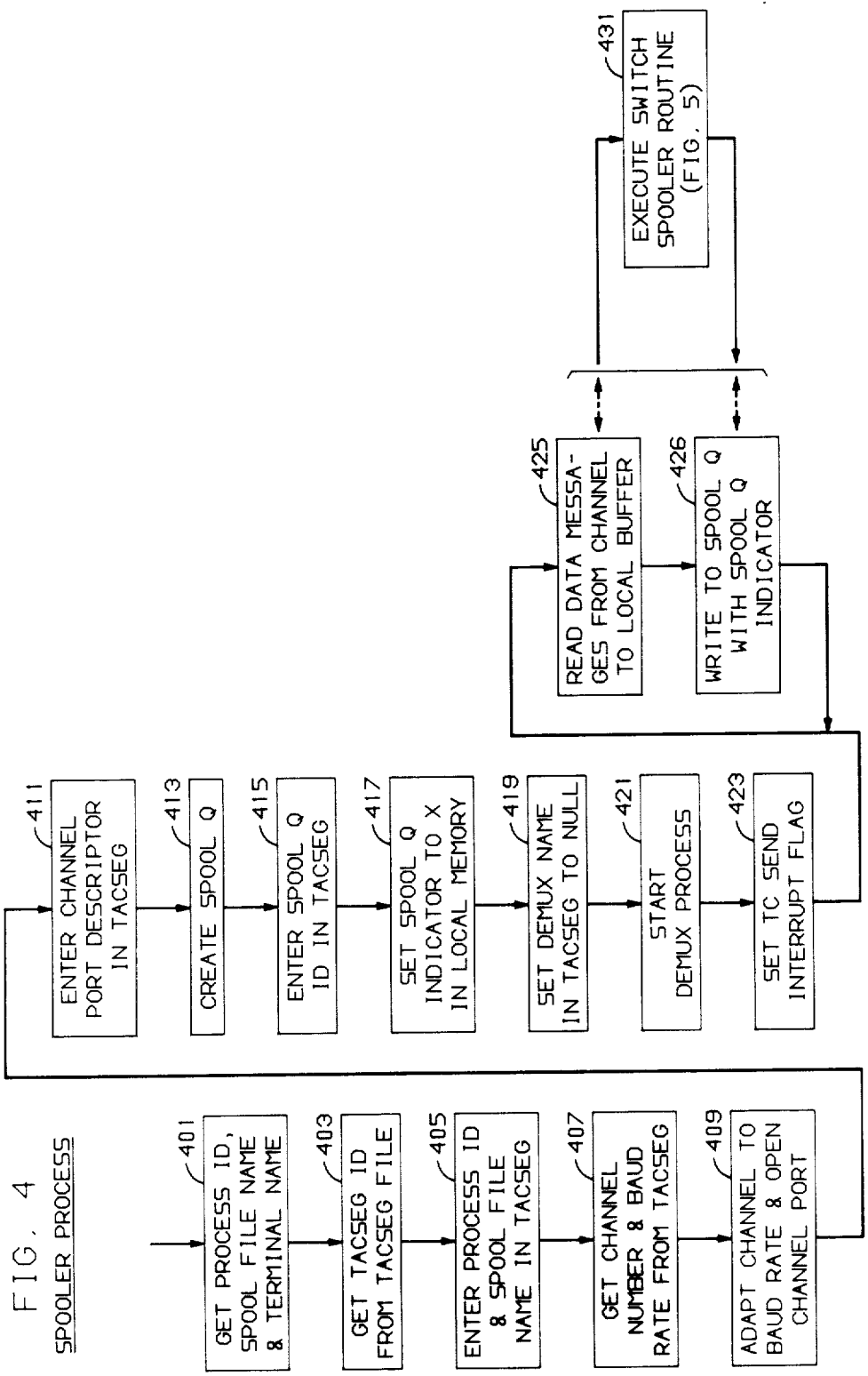
FIG. 4 is a flowchart representation of the spooler process used to enter data in the spool queue of FIG. 2.

FIG. 4 is a flowchart representation of the spooler process 201 of FIG. 2. The spooler process is started by the operating system in response to a command initiated by a user as indicated in block 401 of FIG. 4, and a process ID is provided. The file name of the spool on which the information is to be stored and the name of the terminal to be emulated are provided by the user. In block 403 the spooler process obtains the TACSEG ID, the address of the shared memory, from the TACSEG FILE, which is at a fixed address in permanent memory. In block 405, the process ID and spool filename are entered in TACSEG. Thereafter, block 407, the channel number and baud rate corresponding to the terminal name are obtained from the TACSEG. This channel information for each of the terminals of the system under test is entered in TACSEG prior to execution of the spooler process.

The spooler process, by interaction with the operating system, adapts part of the terminal access controller to the baud rate specified by the user for the port of the target computer and at the same time prepares the port of the terminal access controller to receive and transmit data. These functions are indicated in block 409. In block 411 a channel descriptor provided by the operating system is stored in the TACSEG by the spooler process. Thereafter, the spooler process extends a call to the operating system to create a spool queue, which is the spool queue 203 shown in FIG. 2. This function is performed in block 413. In block 415 the identity of the created spool queue, obtained from the operating system when the queue is created, is entered in the TACSEG in the appropriate area. In block 417 a spool queue indicator tag is generated and stored in local memory which is particularly reserved to this spooler process. The use of this indicator is described later herein in connection with the tc send process. In block 419 the area in TACSEG reserved for the name of the demux process is set to null demux and in block 421 the null demux process is started. The null demux designation indicates that this is the initially specified version which may be modified by the install process as described later.

Figure 5:
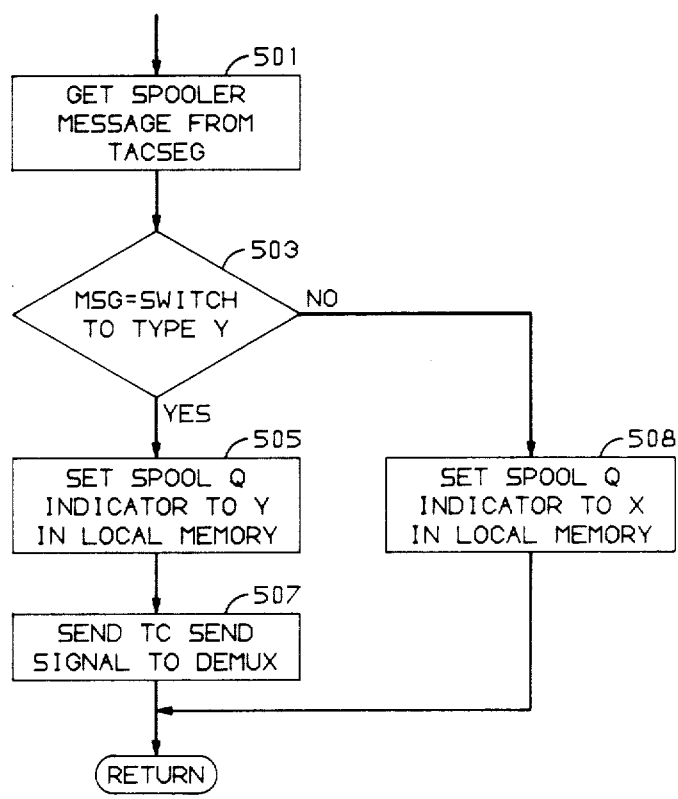
FIG. 5 represents the switch spooler routine of the spooler process, in block diagram form.

In block 423 a tc send interrupt flag is set. This flag indicates that when an interrupt signal is received from the tc send process, the activities of the subsequent portion of the spooler process, blocks 425 and 426, are to be interrupted. This interrupt causes the switch spooler routine to be executed as indicated in block 431. Upon completion of this routine, a return is made to the place at which the interrupt occurred in blocks 425 or 426. The switch spooler routine will be explained later with respect to FIG. 5.

In block 425 data messages obtained from the port or channel identified by the channel number read in block 407, are entered into a local buffer reserved for this process. In block 426 data words are written from the local buffer to the spool queue 203 accompanied by the spool queue indicator tag defined in local memory, as written in block 417. There the indicator tag is defined as "x". The spooler process will continue to insert the "x" tag in spool queue 203 until the indicator is changed in local memory, which may occur during execution of the switch spooler routine indicated in block 431. After the data has been written in the spool queue, the process of blocks 425 and 426 is repeated until the spooler process is terminated.

As indicated earlier, the switch spooler routine is a subroutine of the spooler process and is executed in response to an interrupt from the tc send process which changes the interrupt flag set in block 423 of FIG. 4. The interrupt occurs when a search is to be executed by the tc send process as described with respect to FIGS. 15 and 16. The switch spooler routine is shown in block diagram form in FIG. 5. In block 501 this routine reads the spooler message from the TACSEG. This message will have been entered by the tc send process. In block 503 a test is made to determine if the spooler message indicates a switch to "x" or a switch to "y". If it indicates a switch to "y", the spool queue indicator in local memory will be set to "y" as indicated in block 505. Subsequently, in block 507, the spooler process communicates with the demux process by sending a tc send signal, in effect passing the tc send interrupt to the demux process. In the event that the test in block 503 indicates that the message obtained from TACSEG does not indicate a switch to "y", the spool queue indicator in local memory is set to "x" in block 508. In either event, when the routine is completed a return is made to the place of the spooler process from which the interrupt was made.

DEMULTIPLEX PROCESS

Figure 6:
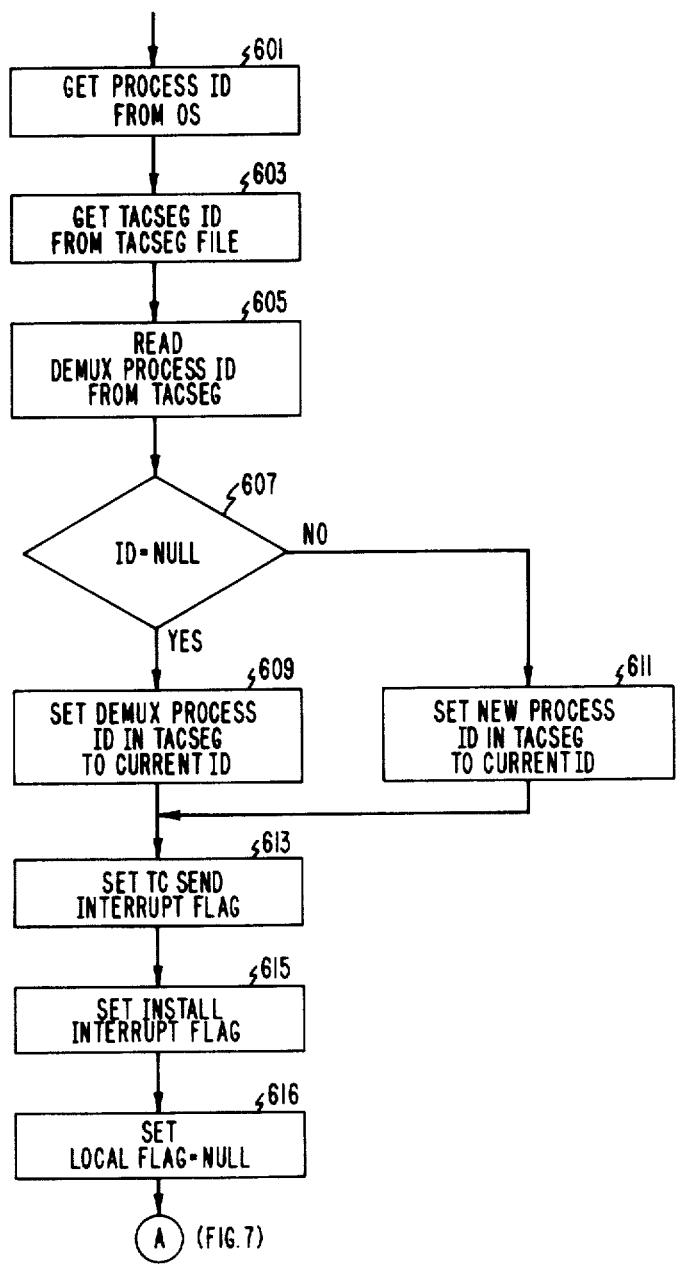
FIGS. 6 and 7 form a flowchart representation of the demux process which transfers data messages from the spool queue to the demux queue of FIG. 2.
Figure 7:
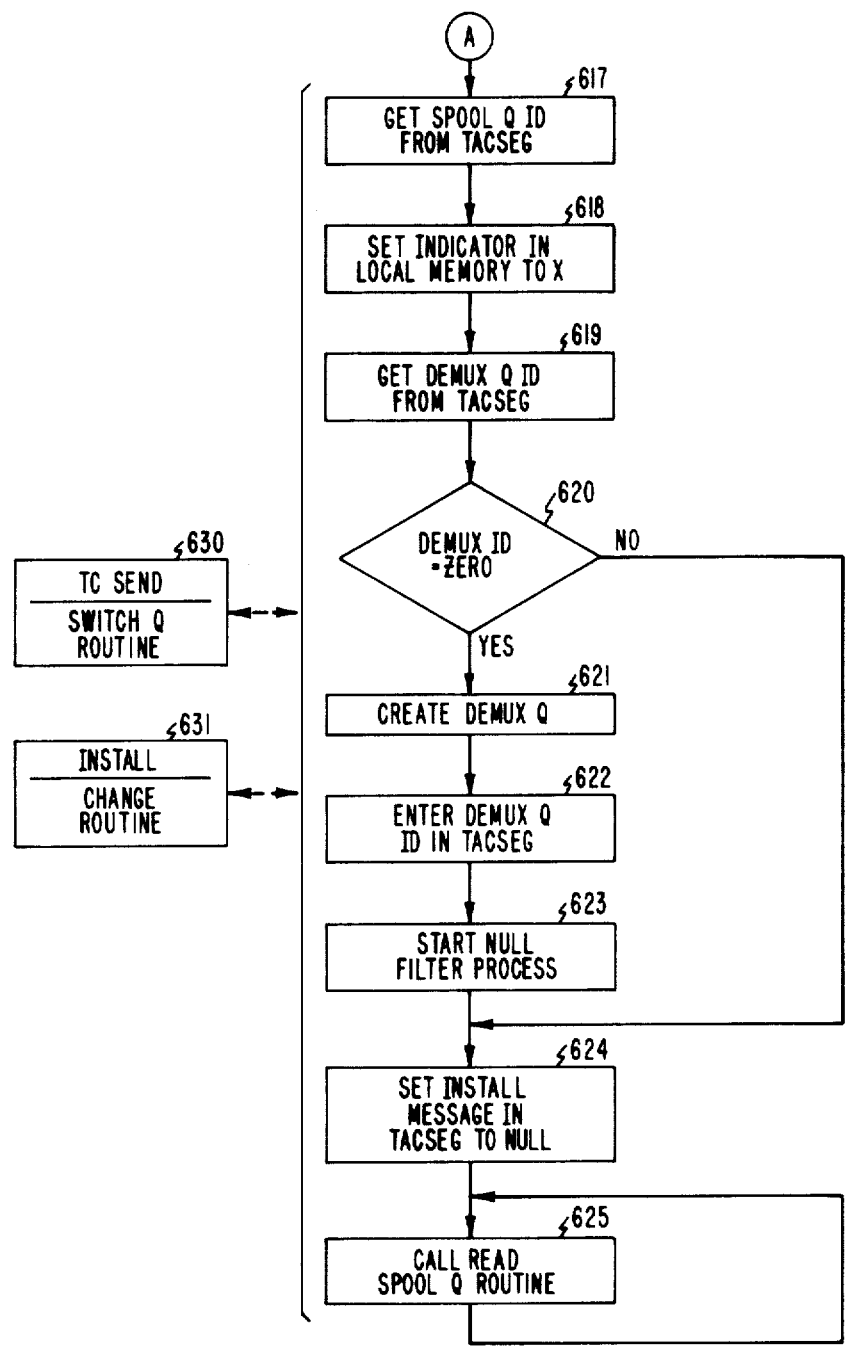

The demultiplex process 205 of FIG. 2 is represented in block diagram form in FIGS. 6 and 7. The function of this process is to transfer data from the spool queue 203 to the demux queue 207 while separating received data messages by message type indicative of message destinations. A demultiplex process is started by the spooler process, described previously, or by the install process when a replacement for an active demux process is requested. In block 601 of FIG. 6 the demultiplex process obtains its process ID from the operating system. In block 603 it obtains the TACSEG ID, the address of the shared memory, from the TACSEG FILE which is stored at a fixed address in permanent memory. In block 605 the demux process ID is read from TACSEG. In block 607 a test is made to determine if read demux process ID is null. If it is, this indicates that the process was started from the spooler process. If the demux process is entered from the install process, an active process ID will be present. In the event the process ID read in block 607 is null, the process ID obtained from the operating system in block 601 is entered into the area for demux process ID in the TACSEG, as indicated in block 609. As indicated in block 611, if the test in block 607 shows that the name is other than null, i.e., this process was entered from the install process, an area designated as new demux process ID in TACSEG is set to the process ID obtained from the operating system in block 601.

After the activity of entering the current process ID in the TACSEG, the process sets the tc send interrupt flag in block 613 and the install interrupt flag in block 615. In block 616 a local flag is set equal to null. This flag will be used later in connection with an interrupt from the install process. With these three flags set, an interrupt signal from either the tc send process or the install process will interrupt any of the subsequent activity of the demux process defined blocks 617 through 625 of FIG. 7. In the event that the interrupt occurs in response to a signal from the tc send process, the switch Q subroutine will be executed as indicated in block 630; in response to an interrupt from the install process the change routine will be executed as indicated in block 631. A return will be made to the place where the interrupt occurred in blocks 617 through 625 upon the completion of these routines which are described with respect to FIGS. 10 and 11.

In block 617 of FIG. 7 the spool queue ID is obtained from the TACSEG. This is needed in order to read the spool queue 203. The spool queue ID information was entered in the TACSEG by the spooler process as indicated in block 415 of FIG. 4. In block 618 a local memory area reserved for message indicator tag is set to "x", which will be used subsequently in reading data messages from spool queue 203. In block 619 an area of TACSEG which stores the identification of the demux queue 207 is read and its contents examined in block 620. If the ID is equal to zero, meaning that no valid identification has been entered, a demultiplex queue is created in block 621 and the identity of that queue is entered in the TACSEG, as indicated in block 622. Thereafter, block 623, a filter process is started which will transfer data from the demultiplex queue to a designated storage file.

If the test in block 620 indicates that there is a valid identification for the demux queue, blocks 621 through 623 are bypassed. This will be the case, for example, when the demux process is entered from the install process after the demux process has created the demux queue. In either event, block 624 will be executed to set an area in TACSEG, known as install message, to zero which will be used later in communicating with the install process. Thereafter, the read spool Q routine of FIG. 8 is executed continually, as indicated in block 625.

Figure 8:
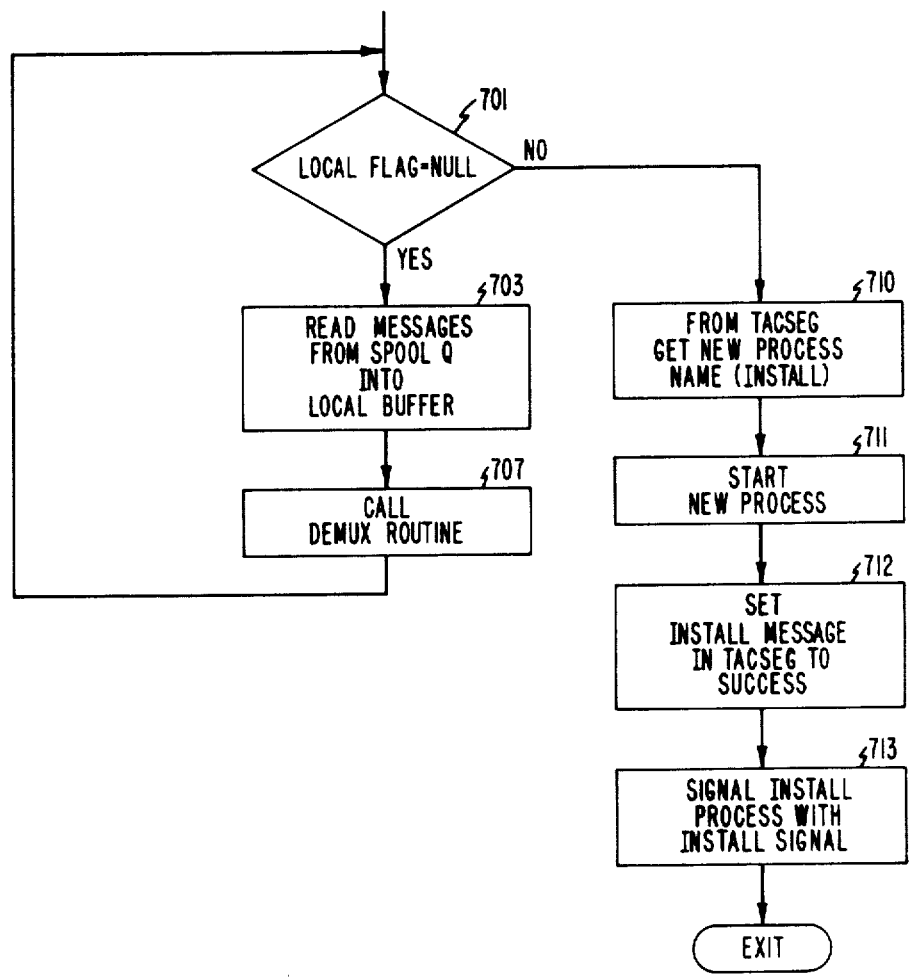
FIGS. 8 through 11 are flowchart representations of subroutines of the demux process of FIGS. 6 and 7.

FIG. 8 is a block diagram representation of the read spool Q routine of the demux process. A test is made in block 701 of FIG. 8 to determine whether the local flag which was set in block 616 of FIG. 6, is still in the null state. If it is, blocks 703 and 707 will be executed repeatedly. Messages will be read from the spool queue 203 into a local buffer associated with the demux process. Only messages in the spool queue accompanied by an indicator as defined in local memory will be read. The local memory indicator was set to "x" in block 618 of FIG. 7, but may be changed from time to time by another process communicating with the demux process. In block 703 a data message having the appropriate indicator is read from the spool queue and stored in a local buffer.

One function of the demux process is to separate different data messages for storage in different spooler files. It does this by adding a filter designation, specified by the user, to the data messages which it transfers from the spool queue 203 to the demux queue 207. Subsequently, the filter processes 211 and 213 transfers messages with different identification coded spool files 215 and 217. In block 707 of FIG. 8, a call is made to the demux routine of FIG. 9, which examines the data message read from the spool queue and enters it in the demux queue with a proper message designation. Thereafter, a return is made to block 701 to test the local null flag. The state of this flag will be changed in response to an interrupt message from the install process.

As indicated in block 631 of FIG. 7, the install interrupt change routine will be executed in response to the interrupt message. This routine is detailed in FIG. 10 and serves the sole function of changing the flag from the null state to the install state. This has the effect of terminating the execution of the currently running demux process and substituting a new process which may perform a new and different demultiplexing function independent of the operation of the spooler process and without interrupting the incoming data flow. When it is detected in the test of block 701 that the flag has been changed, an advance is made to block 710 in which the name of the new demux process, supplied by the install process, is obtained from the appropriate area in the TACSEG. In block 711 the new process is started by a call to the operating system. In block 712 the install message in TACSEG (FIG. 23) is set to "success", which will be read subsequently by the install process. Thereafter, in block 713 a signal is sent to the install process indicating a completion of the switch to the new demux process, and the old demux process is terminated by an exit.

Figure 9:
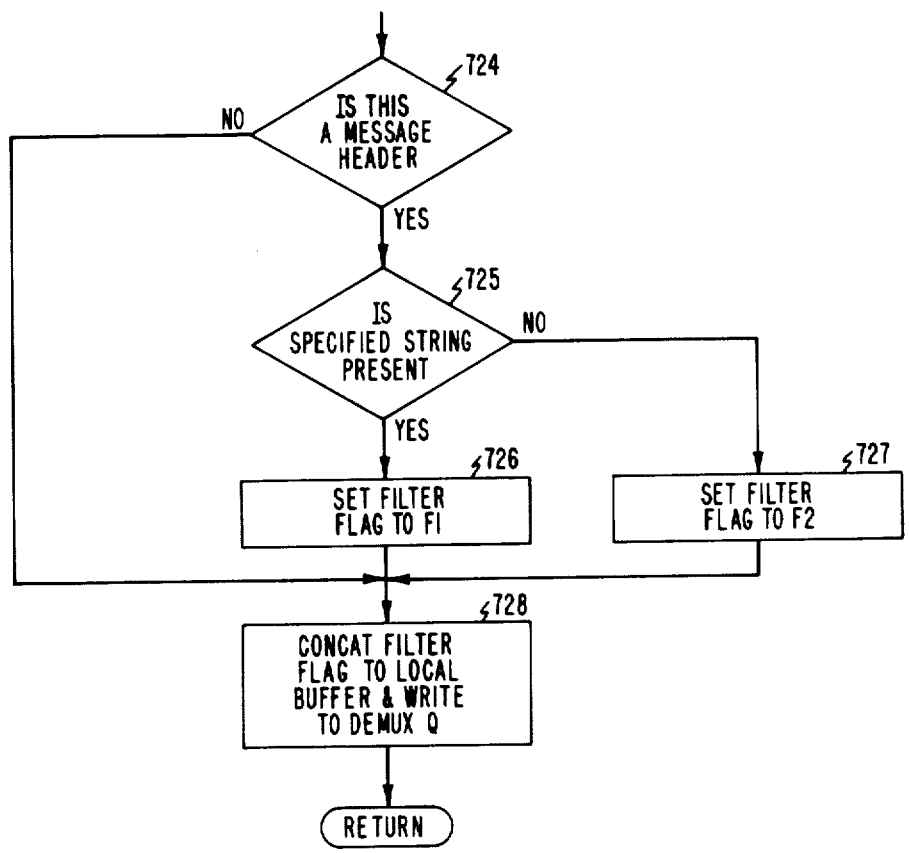

FIG. 9 is a flow diagram representation of an exemplary demux routine of the demux process. Different demux routines may be specified by the user to achieve separation of data into a number of different files. In block 724 of FIG. 9 a test is made to determine whether the data word read from the spool queue is a message header indicating, for example, that subsequent data messages are associated with a specified window of a multiwindowed video display terminal. If it is a message header, a test is made in block 725 to determine whether, for example, one specified string is present. If it is, a local filter flag will be set to position F1 as indicated in block 726. If the specified string is not present in the header, then it is assumed that the message is of a second type and the flag is set to F2 as indicated in block 727. Other tests may be readily devised to identify any number of specified strings or to modify a flag word to define any number of different message types. Subsequent to the setting of the flag, as indicated in block 728, the flag information is concatenated to the data message which was stored in the local buffer in block 703 and is written to the demux queue 207. If it is determined in the test of block 724 that the data word under examination is not a message header, an advance is made to block 728 and the current state of the flag is concatenated to the data message and written into the demux queue. In this manner, a message type indication, as reflected by the flag, is added to all data words following a message header. Other similar processes may be readily developed to detect the presence of messages of different types and appropriately identify them with a message type indication as they are transferred to the demux queue.

Figure 10:
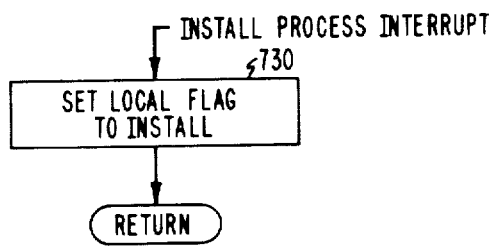
Figure 11:
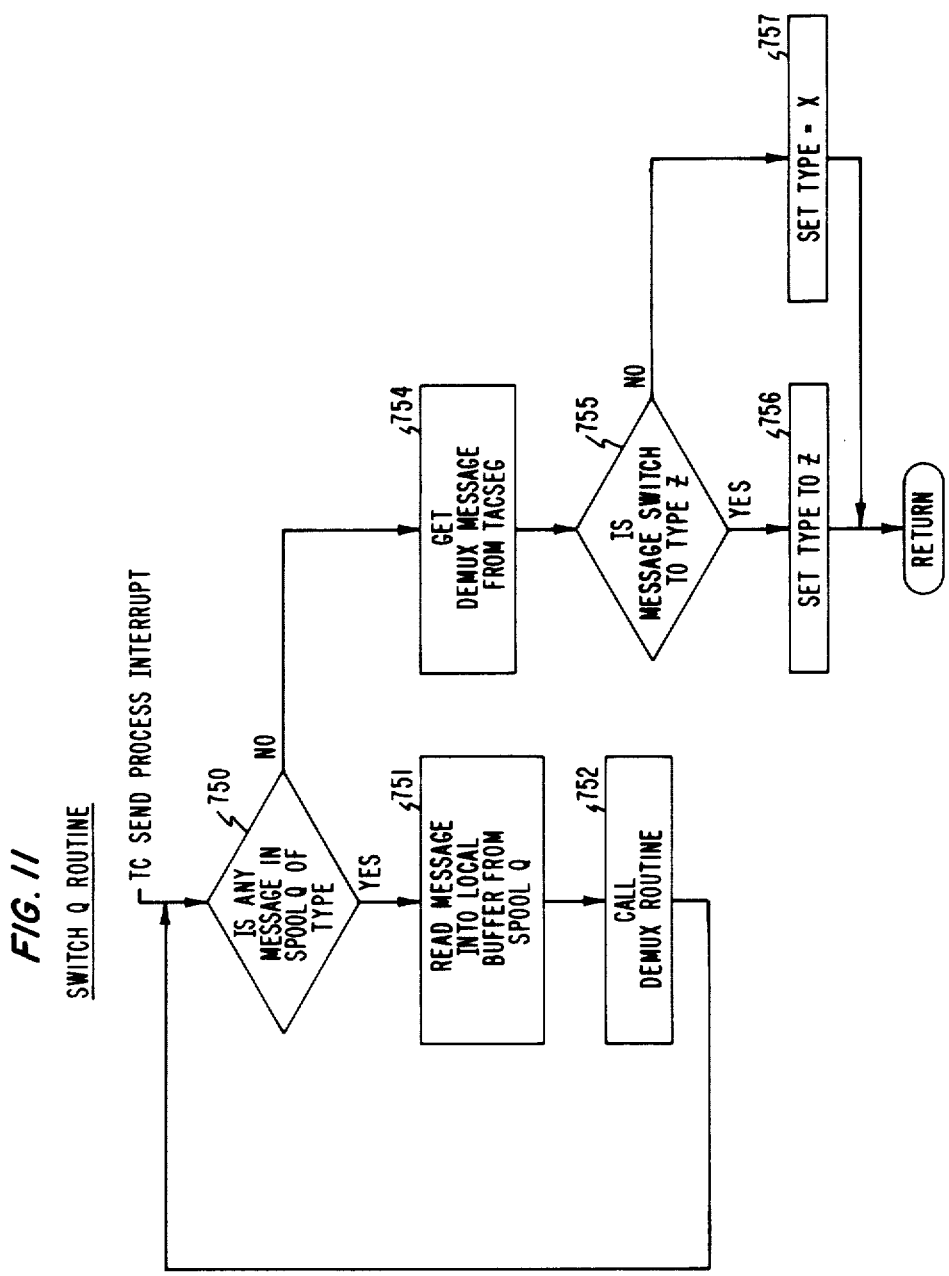

FIGS. 10 and 11 outline the change routine and the switch Q routine which are called by the demux process in blocks 631 and 630 of FIG. 7, respectively. These routines are called in response to interrupts generated by the operating system in response to a request from the tc send or install process but will not affect the demultiplex process unless the appropriate interrupt flag has been set, in block 613 and 615 of FIG. 6. Referring to FIG. 10, an interrupt initiated in response to a message from the install process causes the appropriate local flag referenced in block 616 of FIG. 6 and block 701 of FIG. 8 to be set to "install" as indicated in block 730. Thereafter, a return is made to the point at which the interrupt occurred. Reaction to the change in local the flag will be noted in a subsequent pass through block 701, as described with reference to FIG. 8.

Referring to FIG. 11, an interrupt from the tc send process will cause the spool queue 203 to be examined in block 750. If the next message in the queue is of the same type defined by the indicator in local memory, then the message will be read into the local buffer from the spool queue as indicated in block 751, the demux routine of FIG. 9 will be called as indicated in block 752. The message indicator in local memory examined in block 750 will have been set to "x" in block 618 but may have subsequently been changed by execution of this switch Q routine in block 756. In the event that the message in the spool queue is of a type defined by the indicator stored in the local memory, the switch queue routine will continue to transfer such messages from the spool queue 203 to the demux queue 207. When there are no messages of that type in spool queue 203, a transfer is made from decision block 750 to block 754. In block 754 an area of TACSEG referred to as a demux message is read and examined in block 755. The message, which originates from the tc send process, will indicate whether a switch is to be made to "x" or "z". If a switch is to be made to "z", the message indicator in local memory is changed to "z" in block 756. Otherwise, the local memory is changed to "x" in block 757. Thereafter, a return is made to the place of interruption in the demux process. In this manner, all messages of one type (e.g. "x") will be removed from the queue before a switch is made to removing messages of another type.

FILTER PROCESS

The illustrative system has the capability of having multiple active filters to transfer data messages from the demux queue to associated spool files in a permanent memory such as disk store 105. One such filter process is represented in flowchart form in FIG. 12. The filter process when it is started, will obtain a process ID from the operating system as indicated in block 801. In block 802 the address of the TACSEG, the shared memory, is obtained from the TACSEG file which is at a fixed address in permanent memory. In block 803 the area of TACSEG identified as the filter process ID is read and in block 804 a test is made to determine whether a valid ID is already present. If the entry is zero, then the new process ID obtained from the operating system in block 801 is written in this entry as shown in block 805 of FIG. 12. If it is found during a test of block 804 that a valid process ID is already present in the TACSEG, then the ID of the new process obtained in block 801 is entered in an area of TACSEG referred to as install new process ID, as indicated in block 806. The fact that the filter process ID entry in the TACSEG contains a valid ID indicates that this process is either a change from a prior process or the addition of a new filter process under control of the install process. In block 807 the filter process sets a local flag to null and in block 808 reads the ID of the demux queue 207 from the TACSEG. In block 809 it obtains the spool file name from the TACSEG and in block 810 opens the spool file by means of a call to the operating system.

The function of the filter process is to transfer data messages from the demux queue to the designated spool file. As discussed above in connection with the demultiplex process, the demux queue 207 may contain data messages for different spool files. A filter process is initiated for each spool file and the particular filter process only reads those messages out of demux queue 207 which are designated for the associated filter. In block 812 the filter flag of this illustrative process is set to F1, meaning that it will only read messages from the demux queue which carry the flag F1. In the illustrative system of FIG. 2, having at least two filter processes 211 and 213, another filter process is started which will have the filter flag set to F2 to read messages accompanied by flag F2.

In block 813 an entry in the TACSEG known as the install message is set to null. In block 814 the install interrupt flag is set. Any interrupt request from the install process occurring after this point will be allowed to interrupt the operation of the filter process. After setting the interrupt flag in block 814, the read demux queue routine (FIG. 13) is called in block 815. When the install interrupt occurs the change filter routine (FIG. 14) is executed, as indicated in block 817, and a return is made to the appropriate point of the read demux queue routine.

In block 820 of FIG. 14 upon entry of the read demux queue routine, the local flag which was set in block 807 of FIG. 12 is examined. If it is equal to null, messages corresponding to the filter flag set in block 812 of FIG. 12, are read from the demux queue into a local buffer. This is indicated in block 821. In block 822 a time stamp is added to the data message in the buffer and in block 823 the contents of the buffer are written to the designated spool file. The addition of the time stamp is an example of a message modification function carried out by the filter process. Other modifications may be made to the message as desired. For example, certain data fields could be deleted or altered prior to being stored in the spool file. Each filter process may have its own unique function. This function may be readily changed by replacing the current filter process with another having different modification parameters, under control of the install process described later herein.

After a data message has been written to the spool file as indicated in block 823, a return is made to block 820 and the local flag is again tested. Thus, the transfer and modification function is repeated until the local flag is changed. This will occur in response to the interrupt signal from the install process by execution of the change routine of FIG. 13. When such a change has been completed, a transition will be made to block 825 upon the next reading of the flag in block 820. In blocks 825 through 828 of FIG. 14 steps are taken to kill this filter process and to start a new filter process. In block 825 the name of the new process to be initiated is obtained from the TACSEG and in block 826 a call is made to the operating system to start the new process defined by the name obtained in block 825. In block 827 the filter install message in the TACSEG is set to success and in block 828 a signal is sent to the install process indicating that the change has been completed. After a successful completion the current filter process will terminate by an exit.

FIG. 13 represents the change filter routine which is executed in response to the install interrupt which may occur after the interrupt flag has been set in block 814 of FIG. 12. In block 830 of FIG. 13 the local flag is changed from null to reflect an install request and a return is made to the place where the filter process was interrupted.

TC SEND PROCESS

The tc send process is outlined in block diagram form in FIGS. 15 through 18. The tc send process performs the function of sending data on a data channel and/or searching for a predefined data string in data received from a data channel. In the send mode, the tc send process 220 serves to transmit data to the target computer. In the search mode the tc send process reads data from the spool queue 203, examines it and returns it to the spool queue after examination. In the event that a requested data pattern is detected, a flag is set indicating that the desired data string has been found. The tc send process 220 communicates with the spooler process 201 and the demux process 205 to cause the demux process to read from the spool queue 203 only those items that have been examined by the tc send process. When a data item is written in the spool queue an indicator is appended to the data item and the process reading data from the spool queue selects only those having a specified indicator. In the present embodiment of the invention, the spooler process appends indicator "x" and the demux process reads indicator "x" if the search mode has not been activated. When the tc send process enters the search mode, it causes the spooler process to append indicator "y" with the data items and causes the demux process to read data items with indicator "z". The tc send process itself then reads indicator "y" and writes the data item back in the queue after examination with indicator "z". Upon completion of the search the spooler process is returned to writing "x" and the demux process is returned to reading "x" after all "z" items have been removed as described earlier with respect to FIG. 11.

Figure 15:
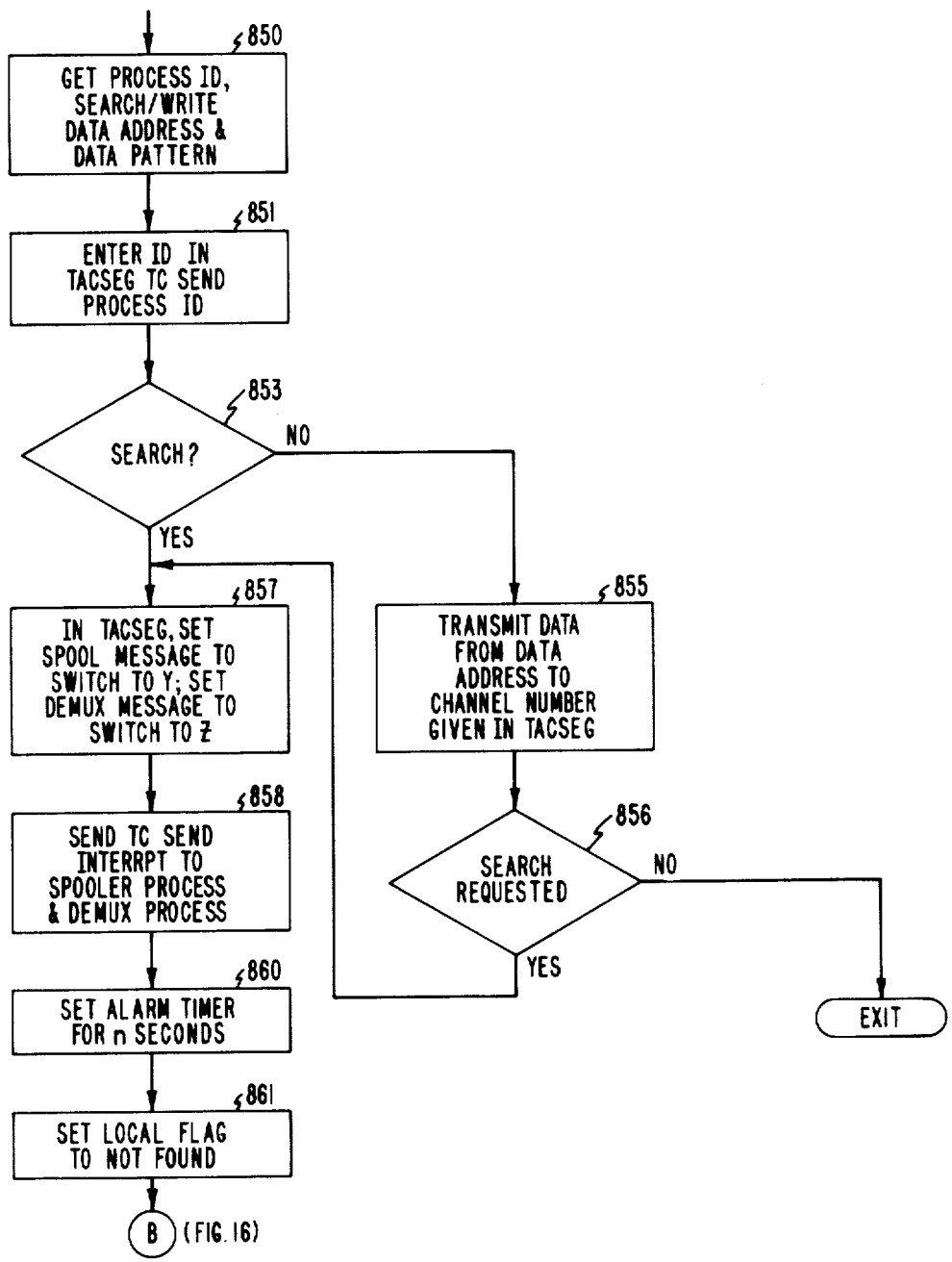
FIGS. 15 and 16 are a flowchart representation of the tc send process which performs the functions of transmitting data and searching data in the spool queue.
Figure 16:
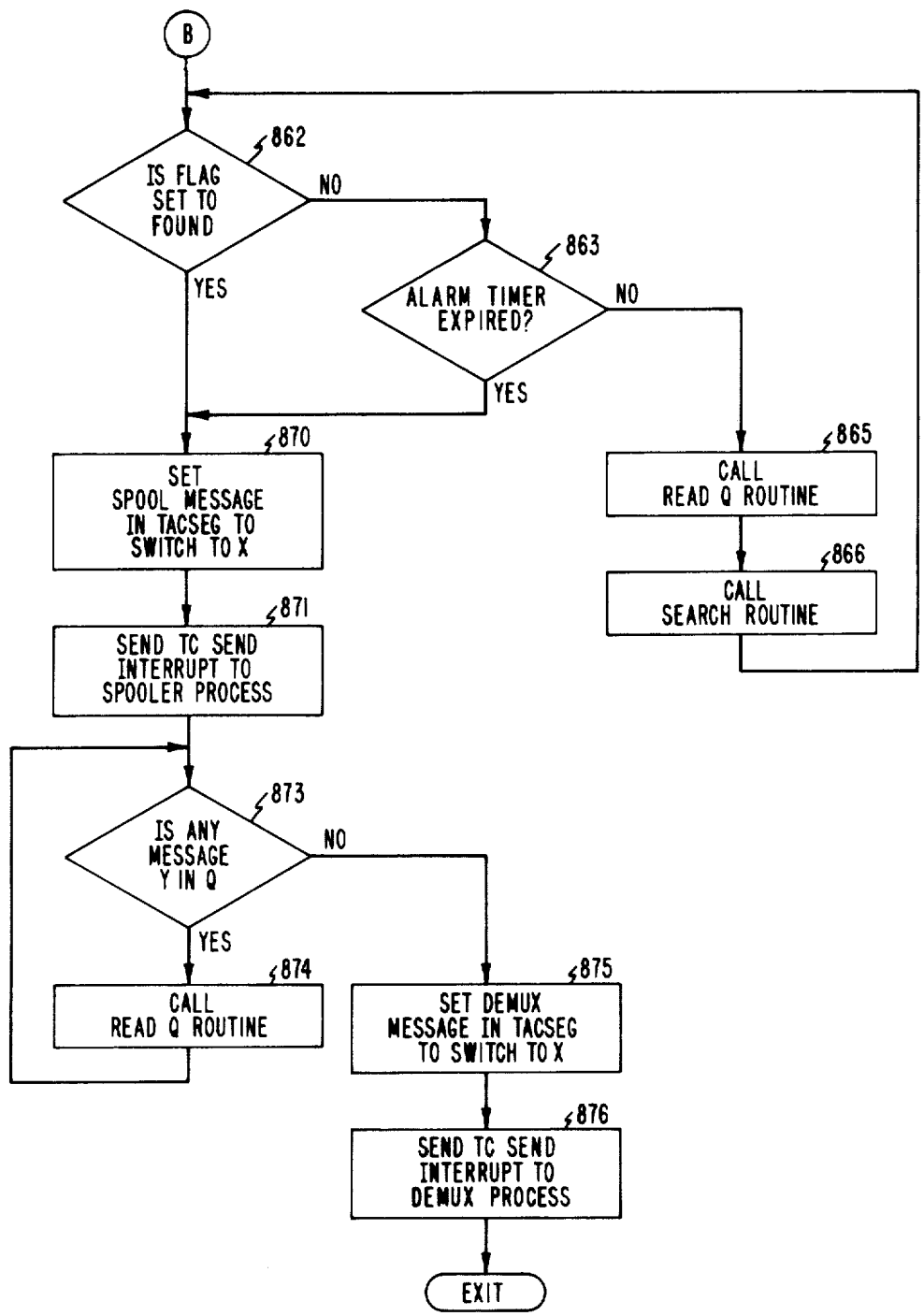

FIGS. 15 and 16 taken together form a flowchart representation of the tc send process. Upon initiation, the process obtains the process ID from the operating system such and several user-supplied items such as an indication whether this is a search or a write operation, as well as the address of data to be transmitted and the channel number in the case of a write, and the desired data pattern in the case of a search. This is indicated in block 850 of FIG. 15. In block 851 the process ID is entered in the TACSEG in area indicated as tc send process ID in FIG. 22. If it is a write operation, the data defined by the data address is transmitted to the channel number identified in the TACSEG. This operation is indicated in block 855. Thereafter, in block 856 a test is made to determine whether a search is also required. If so, a transfer is made to block 857; if not, the process is terminated.

Figure 17:
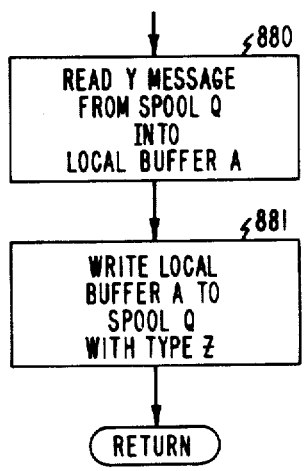
FIGS. 17 and 18 are subroutines of the tc send process of FIGS. 15 and 16.
Figure 18:
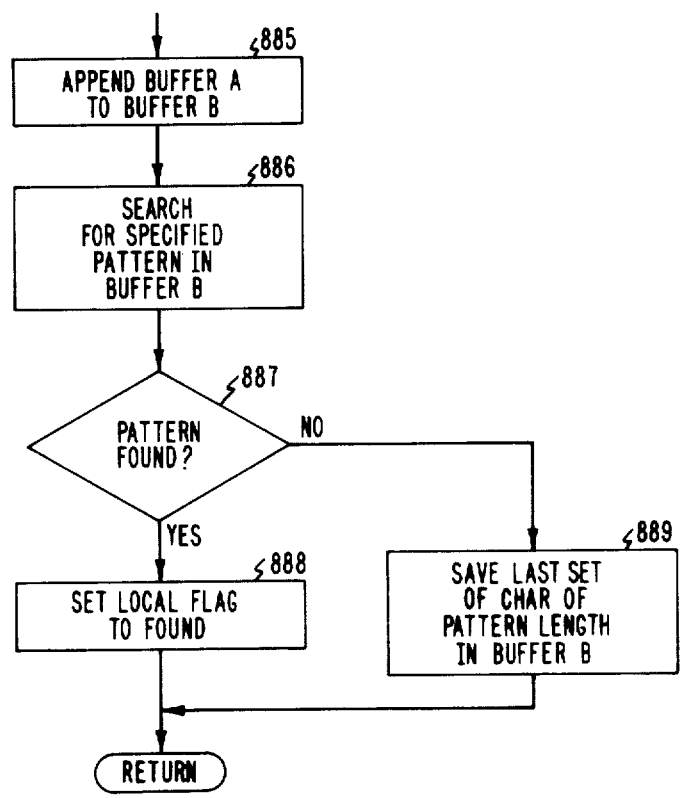

A test is made in block 853 and if it indicates that it is a search operation, the spooler message in TACSEG (FIG. 22) is set to "switch to y" and the demux message in TACSEG is set to "switch to z". This is indicated in block 857. Subsequently, in block 858 an interrupt signal is sent via the operating system to the spooler process and the demux process. Prior to this time the spooler process would have been writing indicator "x" in the spool queue and the demux process would have been reading "x" from the spool queue. These interrupt signals will cause the spooler process to switch to "y" and the demux process to switch to "z", as has been described earlier with respect to the operation of these processes. In block 860 an alarm timer is set to n seconds allowing the process to be terminated after a specified period of searching. The search may be set, for example, for 5 seconds to be terminated if the desired data pattern is not found. In block 861 a local flag is set to indicate that the pattern has not been found. This flag will be reset later in the process if the desired pattern is found. In block 862 in FIG. 16 a test is made of this flag to determine if the pattern has been found. If not, the alarm timer is tested in decision block 863 to determine whether the alarm timer has expired. If the timer has not expired, the read queue routine of FIG. 17 is called in block 865. Upon completion of that routine the search routine of FIG. 18 is called in block 866. If the desired pattern is found, the local flag is set by the search routine to indicate such a condition. The local flag is again tested in block 862 upon completion of the search routine, and if it indicates that the desired pattern has been found the search will be terminated by executing the sequence of blocks 870 through 876. Similarly, this sequence will be executed if it is determined by the test in block 863 that the alarm time has expired.

In block 870 the spooler message in the TACSEG is set to "switch to x". In block 871 the tc send interrupt is sent to the spooler process to cause it to again begin using indicator "x" when it writes a data item to the spool queue 203. Subsequently, in block 873 a test is made to determine whether there is any data item with indicator "y" in the spooler queue. If so, this is taken from the queue and by means of the read queue routine of FIG. 17 is reinserted in the queue with a "z", this is indicated in block 874. When there is no longer any data item of indicator "y" in the spooler queue, the demux message in the TACSEG is set to "switch to x" as indicated in block 875. In block 876 the interrupt signal is sent to the demux process to cause it to switch to reading "x" as discussed above with respect to FIG. 11. This last named action of the tc send process is indicated in block 876 and thereafter the process is terminated by means of an exit.

FIG. 17 shows the tc send read Q routine. This routine is called from blocks 865 and block 874 of FIG. 16. In block 880 of FIG. 17 a data message with indication "y" is read from the spool queue into a local buffer A and in block 881 the contents of buffer A is written into the spool queue with indication "z". Thereafter, a return is made.

FIG. 18 depicts the tc send search routine in flowchart form. This routine is called from block 866 of FIG. 16. The search routine employs a local buffer B and searches this buffer for the specified pattern. Since it is possible that a pattern may be split between data items read from the queue, the search routine saves from a prior reading a specified number of characters equal to the number of characters in the searched pattern in buffer B. The first step in the search routine is to combine the specified number of characters from the last search with the newly received data item. This is accomplished in block 885 by appending the newly received data item placed in buffer A by the read Q routine to the stored characters in buffer B. Thereafter, buffer B is searched for the specified pattern as indicated in block 886. In decision block 887 a decision is made based on the results of the search of block 886. If the desired pattern is found, the local flag which was set to "not found" in block 861 of FIG. 15, is set to "found" in block 888. Thereafter, a return is made. If the test in block 887 indicates that the pattern has not been found, the last set of characters equal to the length of the pattern to be searched are saved in buffer B as indicated in block 889 and a return is made.

INSTALL PROCESS

One of the features of the invention is that the demultiplexing function and filter function may be altered during the execution of a test of a target computer without loss of received data or otherwise interfering with the operation of the system under test. This modification of the demultiplex and filter functions is accomplished by the install process, which is outlined in flow diagram form in FIGS. 19 through 21. The install command is initiated upon request by the user specifying a new demultiplex function or filter function. A new demultiplex function is initiated by killing the current demux process and substituting a new demux process with parameters defined by the user. The filter function may be changed by the substitution of a current filter process or the addition of a new process without disturbing current filter processes.

Figure 19:
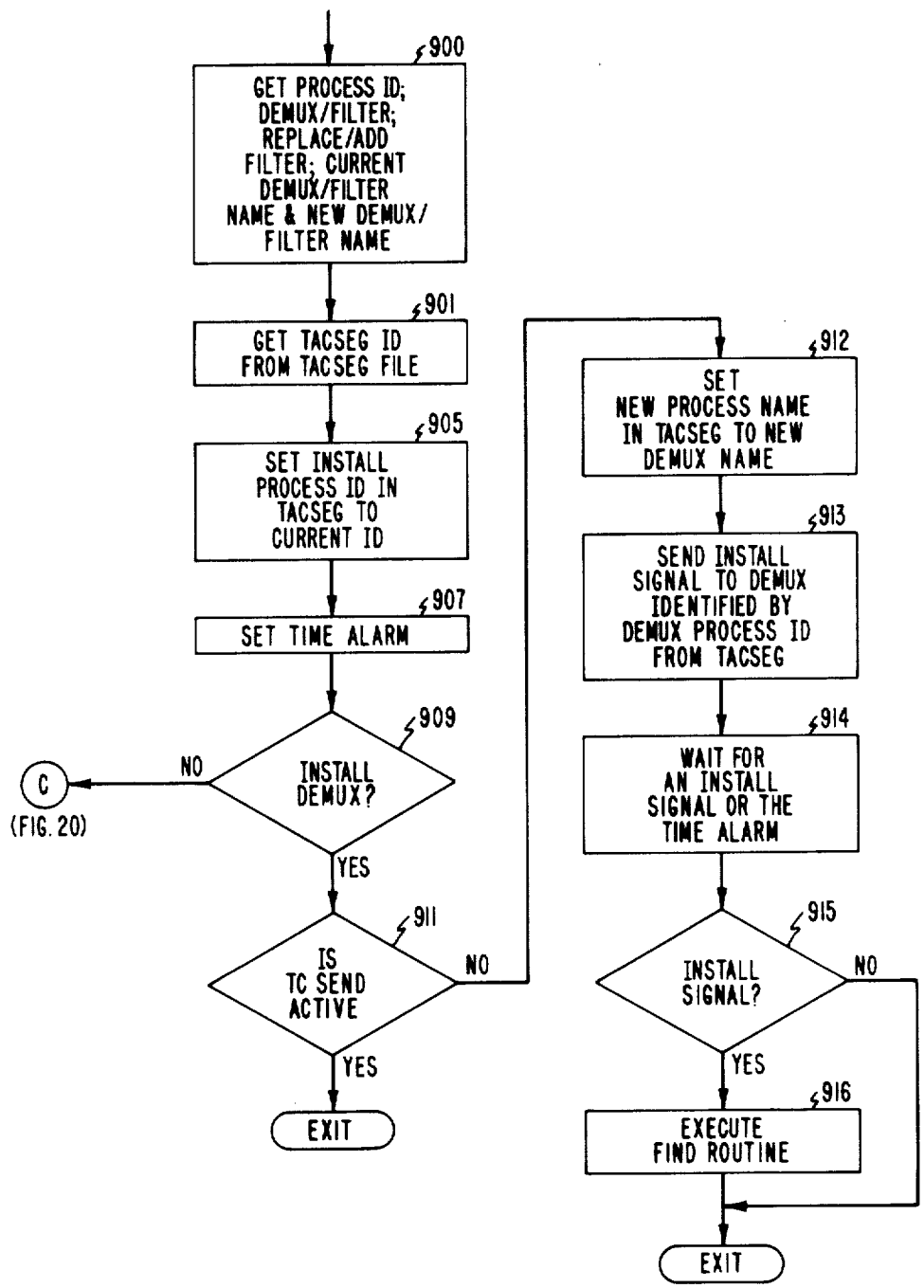
FIGS. 19 and 20 are a flowchart representation of the install process which is used to modify the demux process and the filter process.

As shown in block 900 of FIG. 19, upon initiation the process obtains the process ID from the operating system as well as parameters provided by the user specifying whether a demux or filter process is to be affected whether a filter is to be added or replaced, the name of the process to be replaced and the name of a new process. As indicated in block 901, the TACSEG ID which is the address of the shared memory, is obtained from the TACSEG file which is located at a fixed address in permanent memory. It is assumed that only one install command is active at any one time and the identity of the active install process is written in the install process ID entry of the TACSEG in block 905. In block 907 a time alarm is set which is used later in the process to cause a timeout in the event that communications with other processes are not completed within the specified time, e.g., 5 minutes. In block 909 a decision is made based on the demux/filter information received in block 900. If a new demux process is to be installed as opposed to a filter, a test is made in block 911 to determine if the tc send process is active. This is determined by reading the tc send process ID entry in the TACSEG. If it is other than null, the tc send is assumed to be active and an exit is made at this point. Because of the interaction between the processes, the demux process will not be changed while the tc send process is active. The install process will have to be activated at another time to accomplish the demux process change. Allowing these two processes to be active at the same time would require a more careful discrimination of communication signals and further complicate the system.

Assuming that it is found in the test of block 911 that the tc send process is not active, an advance will be made to block 912 where the name of the new demux process is entered in the new demux process name entry of the TACSEG. In block 913 the TACSEG is read and the install signal is sent to the demux process as identified by the demux process ID entry in the TACSEG. As discussed earlier with respect to the operation of the demux process, the demux process acts to start a new process identified by the new process name in the TACSEG and kills the current process, sending an install signal to the install process upon completion of its required actions. In block 914 of FIG. 19, the install process waits for the signal from the demux process. In case the install signal is not received within a predetermined period of time (e. g. 5 minutes), the time alarm will go off. In either case, an advance will be made to block 915 where a decision is made to determine whether this was a timeout or the receipt of an install signal. If it is a timeout, an exit is made; if it is an install signal, the find routine of FIG. 21 is executed as indicated in block 916.

Referring to FIG. 19 block 909, a decision is made to determine whether the demultiplex function or the filter function is to be modified. If it is determined that the filter function is to be modified, an advance is made to block 920 to determine whether a current filter process is to be modified or a new filter is to be added. If a new filter is to be added, the name of the new filter obtained in block 900 is entered in TACSEG, as indicated in block 921, and a new filter process identified by the new name is spawned, as indicated in block 922. Thereafter, an exit is made since the task of adding a filter has been completed.

Figure 20:
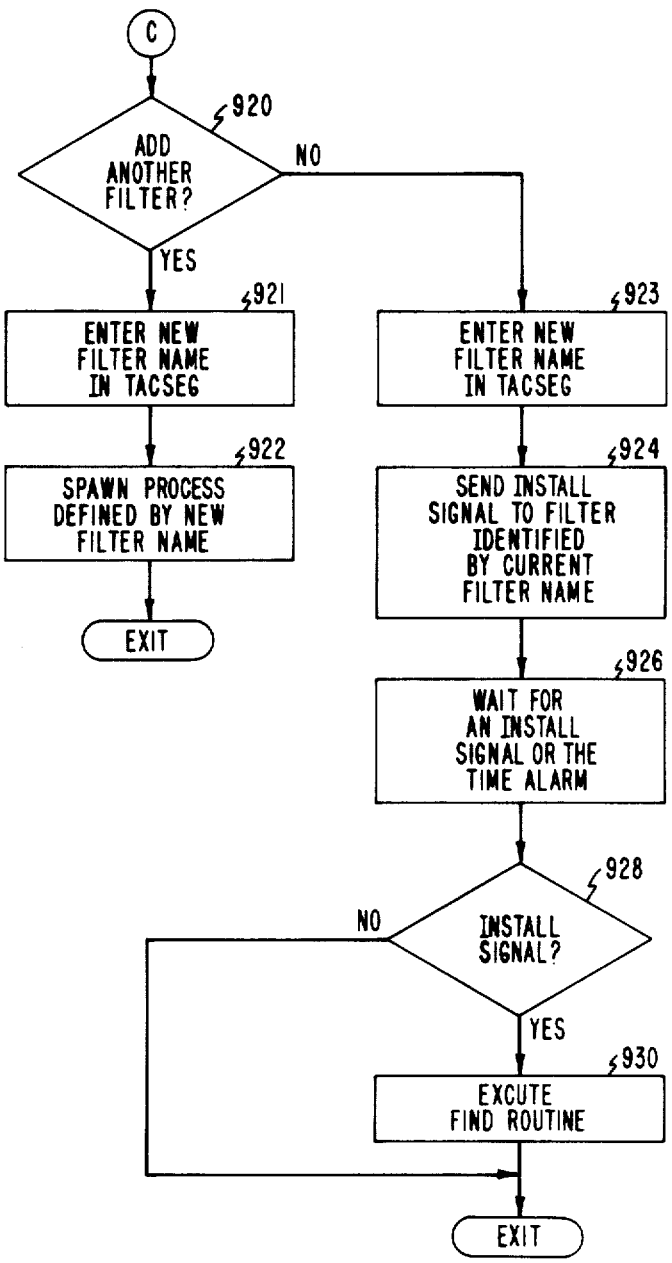

In the event that the decision of block 920 of FIG. 20 based on the information received from the operating system and user in block 900, indicates that an existing filter process is to be replaced, an advance is made to block 923 where the new filter process name is entered in TACSEG. In block 924 an install signal is transmitted to the filter process identified by the current process name obtained in block 900 of FIG. 19. As indicated earlier, the filter process responds to the install signal by starting a new process identified by the new process name entry in the TACSEG, kills the current process and sends an install signal to the install process. In block 926 the install process waits for this signal to be received. In the event that the signal does not arrive before the time alarm set in box 907 of FIG. 19 is activated, an advance is made to decision block 928. If an install signal was received, the find routine is executed as indicated in block 930. If a timeout occurred an exit is made indicating that the install command was not successfully executed.

Figure 21:
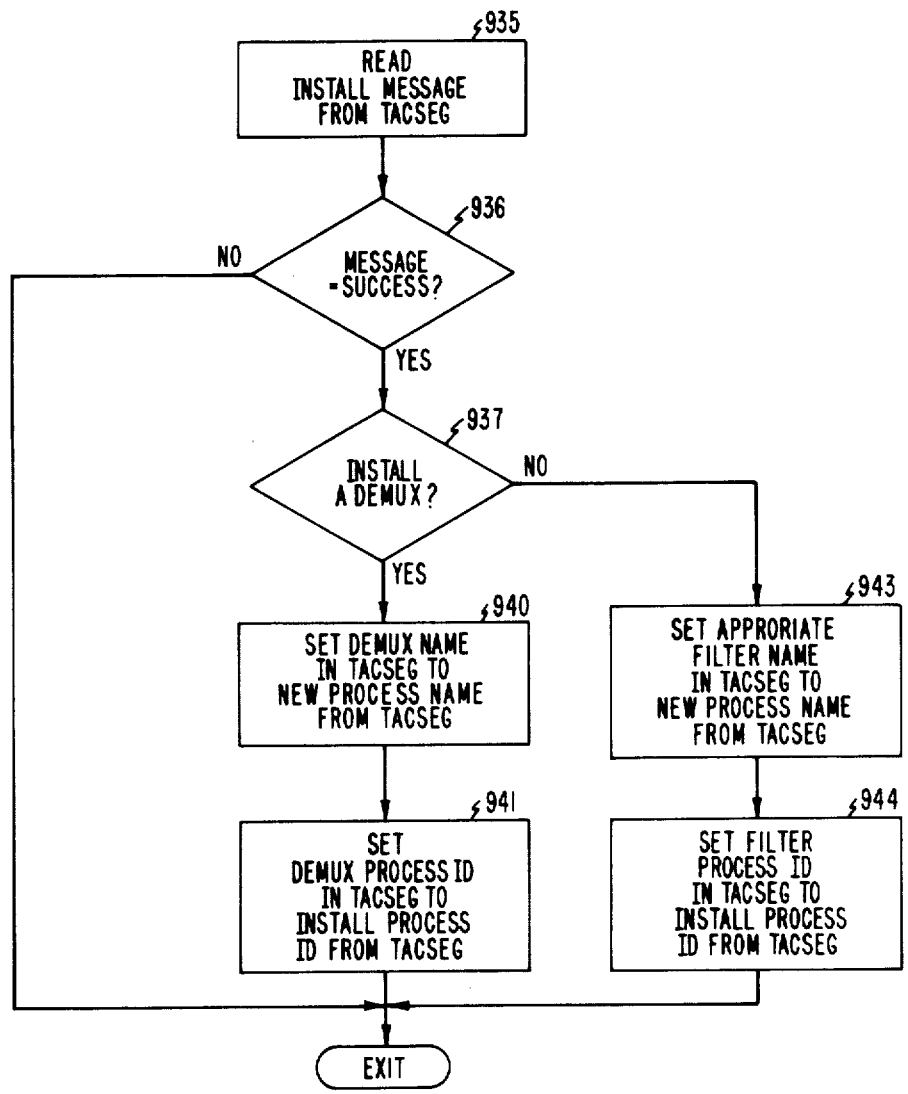
FIG. 21 is a subroutine of the install process of FIGS. 19 and 20.

The find routine referenced in blocks 916 of FIG. 19 and 930 of FIG. 20 is outlined in block diagram form in FIG. 21. Upon entering the find routine, the install message is read from the TACSEG in block 935. This message is written either by the demux process or the filter process. The process being affected by the install process, in addition to sending an install signal as referred to in boxes 914 of FIG. 19 and 926 of FIG. 20, will enter either a success or failure message in the install message entry of the TACSEG. In block 936 of FIG. 21 a test is made to determine whether the message indicates success or failure. If it is failure an exit is made from the program. Otherwise, a further test is made in block 937 based on the information obtained from the user to determine whether the install process relates to a demux or filter process. If it relates to a demux process, an advance is made to block 940. Here the demux name entry in the TACSEG is updated with the name found in the demux new process name entry of the TACSEG to reflect the name of the process now operating. Next, in block 941 the contents of the install process ID entry in TACSEG is transferred to the demux ID entry. The install process ID entry was updated in block 905 with the process ID obtained from the operating system at the start of the install process. Thus, the install process lends its ID to the new demux process.

If it is determined in decision block 937 that a filter is affected by the install process, an advance is made to block 943. Here, the filter name entry in TACSEG of the current filter identified by the user, is changed to the new process name which entered into TACSEG in block 923 of FIG. 20. This reflects the replacement of the current filter with another filter identified by the new name specified by the user. In block 944 the filter process ID entry associated with the changed filter name is updated and with the contents of the install process ID entry of TACSEG. Thus, the process ID of the install process is lent to the newly activated filter.

It is to be understood that the above-described arrangement is merely an illustrative application of the principles of the invention; numerous other arrangements may be devised by those skilled in the art without departing from the spirit and scope of the invention.

What is claimed is:

1. A computer testing arrangement comprising:
   a plurality of test set ports;
   a first and second memory queue;
   a plurality of data storage files;
   means for transferring data messages from said test set ports to said first memory queue;
   means for reading and examining messages from said first queue and for storing messages read from said first queue into said second queue together with a message designation indicative of message type;
   means for transferring data messages having a first predetermined message designation from said second queue to a first one of said data storage files and for transferring data messages having another predetermined message designation from said second queue to another of said data storage files.

2. The arrangement in accordance with claim 1 wherein said means for transferring data messages from said second queue includes filtering means for selectively deleting or modifying certain portions of data messages transferred from said second queue to said data storage files.

3. The arrangement in accordance with claim 1 and further comprising search means for obtaining data messages from said first queue and for searching said obtained messages for a predetermined message content.

4. An arrangement for controlling and monitoring operation of a computer comprising:
   at least one input/output port;
   means for storing program commands;
   a data queue for storing data words;
   a file store for storing data words;
   means responsive to said program commands to transmit data words upon said input/output port and for storing data words received on said input/output port in said data queue and for subsequently transferring said data words from said data queue to said file store.

5. An arrangement in accordance with claim 4 further comprising additional input/output ports and additional spool queues, one set of additional spool queues associated with each of said additional ports, and wherein said means responsive to program commands stores data words received on said additional ports in the associated spool queues and subsequently transfers data words from said additional spool queues to said file store.

6. An arrangement in accordance with claim 5, wherein said file store comprises a plurality of storage areas and said means responsive to said program commands differentiates between types of data words stored in said data queue and transfers data words of different types from said queue to different storage areas of said file store.

7. An arrangement for monitoring the operations of a computer, comprising:
   an input port;
   means for storing program commands;
   a file store having a plurality of areas for storing data words;
   a first data queue for storing data words and a second data queue for storing data words;
   means responsive to said program commands for storing data words received on said input port in said first queue and for transferring data words from said first queue to said second queue together with a message type designation derived from a predefined sequence of characters in said data words stored in said first queue and for transferring data words having different message type designations from said second queue to different areas of said file store.

8. An arrangement in accordance with claim 7 wherein said means responsive to program commands is responsive to a specified command to store received data words in said first queue together with a first indication and transfers only data words of a second indication to said second queue and further responsive to said specified command to examine data words with said first indication for a predefined sequence of characters and to change the indication of data words in said second queue from said first indication to said second indication.

9. An arrangement in accordance with claim 7, wherein said means responsive to program commands is responsive to specific commands to alter the predefined sequence of characters defining message type, whereby data messages are stored in separate areas of said file store depending on message content and criteria for defining separate storage areas are changed without loss of data received on said input port.

10. A method of monitoring operation of a computer in a data handling arrangement having a plurality of storage queues and data files and at least one input port connected to a computer to be monitored, comprising the steps of:
   storing data messages received on said port in a first data queue associated with said port;
   transferring data messages from said first data queue to a second data queue and adding to each transferred message an identification code defining message type in accordance with predefined identification criteria;

selectively transferring data messages of different types from said second data queue to different data files as defined by identification codes stored in said second data queue.

11. The method of claim 10 wherein said step of transferring data messages to said files includes the step of selectively altering portions of data messages transferred from said second queue to said files in accordanc with predefined filtering criteria.

12. The method in accordance with claim 11, further comprising the step of halting the transferring of data messages from said second data queue, redefining said filtering criteria, and restarting the transferring of data messages from said second data queue to said data files, whereby the criteria for altering data messages may be changed without loss or mutilation of data messages received on said port.

13. The method in accordance with claim 10, wherein said step of transferring data messages from said first data queue to said second data queue comprises the steps of transferring data messages from said first data queue to a third data queue, searching messages in said third data queue for predetermined message content, and transferring searched data messages to said second data queue.

14. The method in accordance with claim 13, wherein said step of searching further comprises transferring data messages from said third to a fourth data queue before being transferred to said second data queue.

15. The method in accordance with claim 10, wherein said step of storing data messages in said first data queue includes storing a first indication with each message stored in said first data queue, wherein said method further comprises the step of searching data messages in said first data queue having said first indication for a predetermined message content and storing a second indication with each message in said first data queue, and wherein said step of transferring data messages to said second data queue includes examining said indications stored in said first queue and transferring only messages with said second indication.

16. The method in accordance with claim 10, further comprising the steps of halting the transferring of data messages from said first data queue to said second data queue, modifying said predefined identification criteria, and resuming the transferring of data messages from said first data queue to said second data queue, whereby a destination file for received data messages may be altered without interrupting incoming data messages.

17. In a computer having an input port, a method of storing and selectively searching messages of a stream of incoming data messages received on said input port, in response to search requests, comprising the steps of:
storing incoming data messages in a data queue together with a first indication when no search request has been made and for storing incoming data messages in said data queue together with a second indication when a search request has been made;
searching data messages stored with said second indication when a search request has been made and writing a third indication with data messages in said data queue;
selectively transferring data messages with said first indication from said data queue to a data file when no search request has been made and transferring data messages with said third indication to said data file when a search request has been made.

18. The method in accordance with claim 17, wherein said step of transferring comprises the step of finding and transferring all data messages with said first indication before transferring data messages with said third indication in response to a search request and finding and transferring all data messages with said third indication before transferring data messages with said first indication in response to the termination of a search request.

19. A method of testing a computer having a multi-windowed terminal input/output port, comprising the steps of:
transmitting a computer input message on said input/output port;
storing computer output data messages occurring on said port in a first data queue;
analyzing data messages stored in said first data queue and storing analyzed data messages in a second data queue together with an indication identifying a window of a multiwindowed output terminal; and
selectively transferring data messages with different window indications from said second data queue to different data storage files;
whereby computer output data messages destined for different windows of a multiwindowed terminal are stored in separate data files for analysis of output messages generated by a computer in response to computer input message.

20. An arrangement for controlling and monitoring a plurality of computers comprising:
a plurality of input/output ports;
a plurality of data queues;
a file store having a plurality of storage areas for storing data words;
means for storing program commands;
means responsive to said program commands to transmit data words on said ports and for storing data words received on one of said ports in a data queue uniquely associated with said one port and for transferring data words from said data queue uniquely associated with said one port to an area of said file store uniquely associated with said one port.

21. The arrangement in accordance with claim 20 wherein said means responsive to said program commands is responsive to a search program command for searching data words stored in said data queues for a predetermined character string prior to transfer of said data words to said file store.

* * * * *